United States Patent
Wang et al.

(10) Patent No.: US 11,094,335 B1
(45) Date of Patent: Aug. 17, 2021

(54) SYSTEMS AND METHODS FOR AUTOMATIC DETECTION OF PLAGIARIZED SPOKEN RESPONSES

(71) Applicant: Educational Testing Service, Princeton, NJ (US)

(72) Inventors: Xinhao Wang, San Carlos, CA (US);
Keelan Evanini, Pennington, NJ (US);
James Bruno, Oaklyn, NJ (US);
Matthew Mulholland, Ewing, NJ (US)

(73) Assignee: Educational Testing Service, Princeton, NJ (US)

( * ) Notice: Subject to any disclaimer, the term of this patent is extended or adjusted under 35 U.S.C. 154(b) by 60 days.

(21) Appl. No.: 15/656,524

(22) Filed: Jul. 21, 2017

Related U.S. Application Data

(60) Provisional application No. 62/365,427, filed on Jul. 22, 2016.

(51) Int. Cl.
| | |
|---|---|
| *G10L 25/51* | (2013.01) |
| *G10L 15/18* | (2013.01) |
| *G10L 15/22* | (2006.01) |
| *G10L 15/19* | (2013.01) |
| *G10L 15/00* | (2013.01) |

(52) U.S. Cl.
CPC .......... *G10L 25/51* (2013.01); *G10L 15/005* (2013.01); *G10L 15/1807* (2013.01); *G10L 15/19* (2013.01); *G10L 15/22* (2013.01)

(58) Field of Classification Search
CPC ...... G06F 17/2211; G06F 21/10; G06F 21/60; G10L 15/26; G10L 15/005; G10L 25/48; G06K 9/00442; G06K 9/00483; G11B 20/00086
See application file for complete search history.

(56) References Cited

U.S. PATENT DOCUMENTS

| | | | |
|---|---|---|---|
| 7,734,627 B1 * | 6/2010 | Tong | G06F 17/30622 707/737 |
| 9,323,865 B2 * | 4/2016 | Ding | G06F 17/30327 |
| 9,443,513 B2 | 9/2016 | Evanini et al. | |
| 2004/0093202 A1 * | 5/2004 | Fischer | G06K 9/00523 704/216 |

(Continued)

OTHER PUBLICATIONS

Klaus Zechner et al., "Automated Content Scoring of Spoken Responses in an Assessment for Teachers of English", Association for Computational Linguistics, pp. 73-81 (Year: 2013).*

(Continued)

*Primary Examiner* — Mark Villena
(74) *Attorney, Agent, or Firm* — Jones Day

(57) ABSTRACT

Systems and methods are provided for automatic detection of plagiarized spoken responses during standardized testing of language proficiency. A first spoken response to a speaking task that elicits spontaneous speech and a second spoken response to a source-based speaking task that is assumed to be non-plagiarized are digitally recorded. A first and second sets of speaking proficiency features are calculated for the first and the second spoken response, respectively. The first spoken response is classifying as plagiarized or non-plagiarized based on the comparison between the first and the second set of speaking proficiency features. Corresponding apparatuses, systems, and methods are also disclosed.

21 Claims, 6 Drawing Sheets

---

100

110 — Sample source passage: Well, the place I enjoy the most is a small town located in France. I like this small town because it has very charming ocean view. I mean the sky there is so blue and the beach is always full of sunshine. You know how romantic it can ever be, just relax yourself on the beach, when the sun is setting down, when the ocean breeze is blowing and the seabirds are singing. Of course I like this small French town also because there are many great French restaurants. They offer the best seafood in the world like lobsters and tuna fishes. The most important, I have been benefited a lot from this trip to France because I made friends with some gorgeous French girls. One of them even gave me a little watch as a souvenir of our friendship.

120 — Transcription of a plagiarized response: Well, I prefer to return to places I have already visited. Uh I still remember the experience that I went to a small British town located by the by the beach. The scenery is so beautiful. Uh I mean the sky there is very blue and the ocean is always full of sunshine. How romantic it can ever be, just relax yourself on the beach when the sun is setting down, the sea breeze is blowing and the sea birds are singing. I also want to go back there because I met several gorgeous British girls there. Uh we developed consolid-, we developed a solid uh friendships and they even gave me a present uh to cherish our friendships.

(56) References Cited

U.S. PATENT DOCUMENTS

| | | | |
|---|---|---|---|
| 2011/0043652 A1* | 2/2011 | King | G06F 17/2211 348/222.1 |
| 2012/0323573 A1* | 12/2012 | Yoon | G09B 19/06 704/236 |
| 2015/0186787 A1* | 7/2015 | Kumar | G06Q 10/107 706/12 |
| 2015/0269932 A1* | 9/2015 | Evanini | G10L 15/1822 704/235 |
| 2016/0307563 A1* | 10/2016 | Shrivastava | G06F 17/30864 |
| 2017/0109326 A1* | 4/2017 | Tan | G06F 17/218 |

OTHER PUBLICATIONS

Alzahrani, Salha, Salim, Naomie, Abraham, Ajith; Understanding Plagiarism Linguistic Patterns, Textual Features, and Detection Methods; IEEE Transactions on Systems, Man, and Cybernetics—Part C: Applications and Reviews, 42(2); pp. 133-149; Mar. 2012.

Blanchard, Daniel, Heilman, Michael, Madnani, Nitin; SciKit-Learn Laboratory; GitHub repository, https://github.com/EducationalTestingService/skll.; 2013.

Brin, Sergey, Davis, James, Garcia-Molina, Hector; Copy Detection Mechanisms for Digital Documents; Proceedings of the ACM SIGMOD Annual Conference; pp. 398-409; 1995.

Chen, Chien-Ying, Yeh, Jen-Yuan, Ke, Hao-Ren; Plagiarism Detection Using ROUGE and WordNet; Journal of Computing, 2(3); pp. 34-44; Mar. 2010.

Sullen, Pauline, French, Amanda, Jakeman, Vanessa; The Official Cambridge Guide to IELTS; Cambridge University Press; 2014.

ETS; The Official Guide to the TOEFL Test, Fourth Edition; McGraw-Hill: New York, NY; 2012.

Evanini, Keelan, Wang, Xinhao; Automatic Detection of Plagiarized Spoken Responses; Proceedings of the 9th Workshop on Innovative Use of NLP for Building Educational Applications; Baltimore, MD; pp. 22-27; Jun. 2014.

Finch, Andrew, Hwang, Young-Sook, Sumita Eiichiro; Using Machine Translation Evaluation Techniques to Determine Sentence-Level Semantic Equivalence; Proceedings of the 3rd International Workshop on Paraphrasing; pp. 17-24; 2005.

Hauptmann, Alexander; Automatic Spoken Document Retrieval; Encyclopedia of Language and Linguistics, 2d Ed.; Keith Brown, Ed.; pp. 95-103; 2006.

Hoad, Timothy, Zobel, Justin; Methods for Identifying Versioned and Plagiarized Documents; Journal of the American Society for Information Science and Technology, 54(3); pp. 203-215; 2003.

Leacock, Claudia, Chodorow, Martin; Combining Local Context and WordNet Similarity for Word Sense Identification; Ch. 11 in WordNet: An Electronic Lexical Database, C. Fellbaum (Ed.); MIT Press; pp. 305-332; 1998.

Longman, Pearson; The Official Guide to Pearson Test of English Academic; Pearson Education ESL; 2010.

Lyon, Caroline, Barrett, Ruth, Malcolm, James; Plagiarism is Easy, but Also Easy to Detect; Plagiary: Cross-Disciplinary Studies in Plagiarism, Fabrication, and Falsification; pp. 57-65; 2006.

Madnani, Nitin, Tetreault, Joel, Chodorow, Martin; Re-Examining Machine Translation Metrics for Paraphrase Identification; Conference of the North American Chapter of the Association for Computational Linguistics: Human Language Technologies; Montreal, Canada; pp. 182-190; Jun. 2012.

Maurer, Hermann, Kappe, Frank, Zaka, Bilal; Plagiarism—A Survey; Journal of Universal Computer Science, 12(8); pp. 1050-1084; 2006.

Mozgovoy, Maxim, Kakkonen, Tuomo, Sutinen, Erkki; Using Natural Language Parsers in Plagiarism Detection; Proceedings of the ISCA Workshop on Speech and Language Technology in Education (SLaTE); 2007.

Nahnsen, Thade, Uzuner, Ozlem, Katz, Boris; Lexical Chains and Sliding Locality Windows in Context-Based Text Similarity Detection; International Joint Conference on Natural Language Processing; pp. 150-154; 2005.

Papineni, Kishore, Roukos, Salim, Ward, Todd, Zhu, Wei-Jing; Bleu: A Method for Automatic Evaluation of Machine Translation; Proceedings of the 40th Annual Meeting of the Association for Computational Linguistics; pp. 311-318; Jul. 2002.

Potthast, Martin, Hagen, Matthias, Gollub, Tim, Tippmann, Martin, Kiesel, Johannes, Rosso, Paolo, Stamatatos, Efstathios, Stein, Benno; Overview of the 5th International Competition on Plagiarism Detection; CLEF 2013 Evaluation labs and Workshop—Working Notes Papers, P. Forner, R. Navigli, Dan Tuffs (Eds.); Sep. 2013.

Potthast, Martin, Stein, Benno, Barron-Cedeno, Alberto, Rosso, Paolo; An Evaluation Framework for Plagiarism Detection; Proceedings of the 23rd International Conference on Computational Linguistics; pp. 997-1002; Aug. 2010.

Shivakumar, Narayanan, Garcia-Molina, Hector; SCAM: A Copy Detection Mechanism for Digital Documents; Proceedings of the 2nd Annual Conference on the Theory and Practice of Digital Libraries; 1995.

Uzuner, Ozlem, Katz, Boris, Nahnsen, Thade; Using Syntactic Information to Identify Plagiarism; Proceedings of the 2nd Workshop on Building Educational Applications Using NLP; pp. 37-44; Jun. 2005.

Wu, Zhibiao, Palmer, Martha; Verb Semantics and Lexical Selection; Proceedings of the 32nd Annual Meeting of the Association for Computational Linguistics; pp. 133-138; 1994.

Zechner, Klaus, Wang, Xinhao; Automated Content Scoring of Spoken Responses in an Assessment for Teachers of English; Proceedings of the 8th Workshop on Innovative Use of NLP for Building Educational Applications; Atlanta, GA; pp. 73-81; Jun. 2013.

Zechner, Klaus, Higgins, Derrick, Xi, Xiaoming; SpeechRater: A Construct-Driven Approach to Scoring Spontaneous Non-Native Speech; Proceedings of the International Speech Communication Association Special Interest Group on Speech and Language Technology in Education; pp. 128-131; 2007.

Zechner, Klaus, Higgins, Derrick, Xi, Xiaoming, Williamson, David; Automatic Scoring of Non-Native Spontaneous Speech in Tests of Spoken English; Speech Communication, 51(10); 2009.

* cited by examiner

100

Sample source passage: Well, the place I enjoy the most is a small town located in France. I like this small town because it has very charming ocean view. I mean the sky there is so blue and the beach is always full of sunshine. You know how romantic it can ever be, just relax yourself on the beach, when the sun is setting down, when the ocean breeze is blowing and the seabirds are singing. Of course I like this small French town also because there are many great French restaurants. They offer the best seafood in the world like lobsters and tuna fishes. The most important, I have been benefited a lot from this trip to France because I made friends with some gorgeous French girls. One of them even gave me a little watch as a souvenir of our friendship.

Transcription of a plagiarized response: Well, I prefer to return to places I have already visited. Uh I still remember the experience that I went to a small British town located by the by the beach. The scenery is so beautiful. Uh I mean the sky there is very blue and the ocean is always full of sunshine. How romantic it can ever be, just relax yourself on the beach when the sun is setting down, the sea breeze is blowing and the sea birds are singing. I also want to go back there because I met several gorgeous British girls there. Uh we developed consolid-, we developed a solid uh friendships and they even gave me a present uh to cherish our friendships.

|  | Precision | Recall | F1 |
|---|---|---|---|
| BLEU4 | 0.463 | 0.393 | 0.425 |
| BLEU1 to BLEU4 | 0.429 | 0.447 | 0.437 |
| BLEU1 to BLEU11 | 0.438 | 0.444 | 0.44 |

|  | Precision | Recall | F1 |
|---|---|---|---|
| BLEU | 0.743 | 0.461 | 0.569 |
| BLEURV | 0.782 | 0.477 | 0.592 |
| BLEUAffRef | 0.683 | 0.315 | 0.431 |
| WordNet | 0.715 | 0.393 | 0.506 |
| LSA | 0.65 | 0.278 | 0.387 |
| SRater | 0.437 | 0.164 | 0.238 |

| | Precision | Recall | F1 |
|---|---|---|---|
| 1 = BLEU_All | 0.829 | 0.581 | 0.682 |
| 2 = 1 + WordNet | 0.819 | 0.599 | 0.691 |
| 3 = 2 + LSA | 0.82 | 0.603 | 0.695 |
| 4 = 3 + SRater | 0.821 | 0.62 | 0.706 |

| Ratio | Precision | Recall | F1 |
|---|---|---|---|
| 1:1 | 0.951 | 0.912 | 0.931 |
| 1:5 | 0.933 | 0.818 | 0.872 |
| 1:10 | 0.914 | 0.761 | 0.83 |
| 1:20 | 0.884 | 0.7 | 0.781 |
| 1:43 | 0.821 | 0.62 | 0.706 |

FIG. 5

SYSTEMS AND METHODS FOR AUTOMATIC DETECTION OF PLAGIARIZED SPOKEN RESPONSES

CROSS-REFERENCE TO RELATED APPLICATIONS

This application claims priority to U.S. Provisional Application No. 62/365,427, filed Jul. 22, 2016, the entirety of which is herein incorporated by reference.

TECHNICAL FIELD

The technology described herein relates to examination scoring and more particularly to detecting of plagiarism in spoken responses during standardized testing of language proficiency.

BACKGROUND

Due to the vast amount of easily accessible online text on a wide variety of topics, plagiarism of written content has become a vexing problem for educators. To address this problem, several services are available for the automatic plagiarism detection of written texts. Furthermore, a series of shared tasks has enabled a variety of approaches to plagiarism detection to be compared on a standardized set of text documents.

In addition to the domain of writing evaluation, plagiarism can also pose problems for the domain of spoken language evaluation, in particular, the evaluation of non-native speaking proficiency. In the context of large-scale, standardized assessments of spoken English for academic purposes, such as the TOEFL iBT test, the Pearson Test of English Academic, and the IELTS Academic assessment, some test takers may utilize content from online resources in their spoken responses to answer test questions that are intended to elicit spontaneous speech. These responses that are based on plagiarized material pose a problem for both human raters and automated scoring systems, and can reduce the validity of scores that are provided to the test takers.

Some approaches for automated detection of plagiarized spoken responses are described in U.S. Pat. No. 9,443,513, which is incorporated herein by reference in its entirety. The known approaches compare a response of a test taker with a source of plagiarized content. Therefore, they rely on a priori knowledge of the probable source or sources of plagiarized content. However, in some situations such sources are not known. Furthermore, approaches that rely on knowledge of sources may not yield sufficiently successful detection of plagiarized responses. Therefore, there is a need in the art in robust methods and systems for detecting plagiarized spoken responses in standardized assessment of language proficiency that improve detection of plagiarized responses compared to approaches that compare a response with a source. There is also a need in the art in robust methods and systems for detecting plagiarized spoken responses in standardized assessment of language proficiency that do not rely on comparison of a response with a source.

SUMMARY

The present disclosure is directed to a computer-implemented method, system, and non-transitory computer-readable storage medium for detection of plagiarized spoken responses. In an example computer-implemented method for detection of plagiarized spoken responses, a first spoken response is digitally recorded. The first spoken response is a response to a speaking task that elicits spontaneous speech. A first set of speaking proficiency features of the first spoken response is calculated. A second spoken response is also digitally recorded. The second spoken response is a response to a source-based speaking task that is assumed to be non-plagiarized. A second set of speaking proficiency features of the second spoken response is then calculated. The first set of speaking proficiency features and the second set of speaking proficiency features are compared. The first spoken response is classified as plagiarized or non-plagiarized based on the comparison of the first and the second set of speaking proficiency features.

An example system for detection of plagiarized spoken responses includes one or more data processors and a non-transitory computer-readable medium. The non-transitory computer-readable medium is encoded with instructions for commanding the one or more data processors to execute steps of a process. In executing these steps, a first spoken response is digitally recorded. The first spoken response is a response to a speaking task that elicits spontaneous speech. A first set of speaking proficiency features of the first spoken response is calculated. A second spoken response is also digitally recorded. The second spoken response is a response to a source-based speaking task that is assumed to be non-plagiarized. A second set of speaking proficiency features of the second spoken response is calculated. The first set of speaking proficiency features and the second set of speaking proficiency features are compared. The first spoken response is classified as plagiarized or non-plagiarized based on the comparing the first and the second set of speaking proficiency features.

In an example non-transitory computer-readable storage medium for detection of plagiarized spoken responses, the computer-readable storage medium includes computer executable instructions which, when executed, cause a processing system to execute steps. In executing these steps, a first spoken response is digitally recorded. The first spoken response is a response to a speaking task that elicits spontaneous speech. A first set of speaking proficiency features of the first spoken response is calculated. A second spoken response is also digitally recorded. The second spoken response is a response to a source-based speaking task that is assumed to be non-plagiarized. A second set of speaking proficiency features of the second spoken response is calculated. The first set of speaking proficiency features and the second set of speaking proficiency features are compared. The first spoken response is classified as plagiarized or non-plagiarized based on the comparing the first and the second set of speaking proficiency features.

A variety of features are described for automatically detecting plagiarized spoken responses in the context of a standardized assessment of English speaking proficiency. Features that compare various aspects of speaking proficiency across multiple responses provided by a test taker are described, based on the hypothesis that certain aspects of speaking proficiency, such as fluency, may be artificially inflated in a test taker's plagiarized responses in comparison to non-plagiarized responses. These features are designed to be independent of the availability of the reference source materials. The effectiveness of the system on a data set with a large number of control responses is increased where data represents an imbalanced distribution from an operational setting in which only a small number of the test takers' responses are plagiarized.

BRIEF DESCRIPTION OF THE FIGURES

FIG. 1 is an example of a comparison of a transcript of a source passage (FIG. 1A) and a transcript of a plagiarized spoken response (FIG. 1B) based on a source passage.

FIG. 2 is a table illustrating quality of detection of plagiarized spoken response according to one exemplary embodiment.

FIG. 3 is a table illustrating quality of detection of plagiarized spoken response according to another exemplary embodiment.

FIG. 4 is a table illustrating quality of detection of plagiarized spoken response according to another exemplary embodiment.

FIG. 5 is a table illustrating quality of detection of plagiarized spoken response according to another exemplary embodiment.

DETAILED DESCRIPTION

Figure 6:
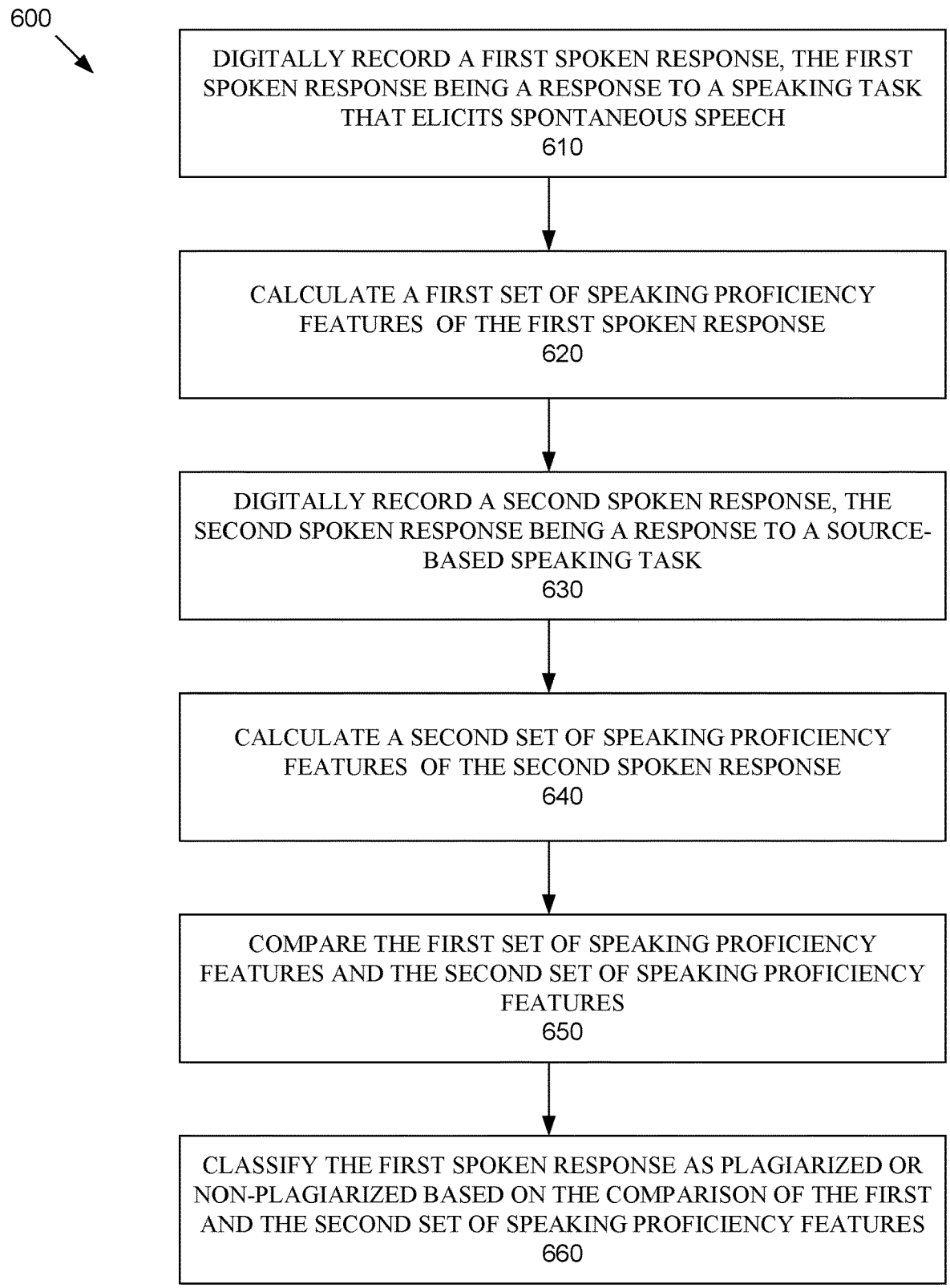
FIG. 6 is a diagram illustrating an exemplary method of detection of plagiarized spoken response.

TOEFL® Internet-based test (TOEFL® iBT) is a large-scale, high-stakes assessment of English for non-native speakers, which assesses English communication skills for academic purposes. The Speaking section of TOEFL iBT contains six tasks to elicit spontaneous spoken responses: two of them require test takers to provide an opinion based on personal experience, which are referred to as independent tasks (in other words, speaking tasks that elicit spontaneous speech); and the other four tasks require them to summarize or discuss material provided in a reading and/or listening passage, which are referred to as integrated tasks (in other words, source-based speaking tasks that are assumed to be non-plagiarized).

The speaking task that elicits spontaneous speech may ask questions that are familiar to test takers and are not based on any stimulus materials. Therefore, they can provide responses containing a wide variety of specific examples. In some cases, test takers may attempt to game the assessment by memorizing plagiarized material from an external source and adapting it to a question asked in the speaking task that elicits spontaneous speech. This type of plagiarism can affect the validity of a test taker's speaking score and can be grounds for score cancellation. However, it may be difficult even for trained human raters to recognize plagiarized spoken responses, due to the large number and variety of external sources that are available from online test preparation sites.

In order to better understand the strategies used by test takers who incorporated material from external sources into their spoken responses and to develop a capability for automated plagiarism detection for speaking items, a data set of plagiarized spoken responses from the operational tests may be collected. Human raters may first flag operational spoken responses that contain potentially plagiarized material, then rater supervisors may subsequently review them and make the final judgment. In the review process, the responses may be transcribed and compared to external source materials obtained through manual internet searches; if it is determined that the presence of plagiarized material makes it impossible to provide a valid assessment of the test taker's performance on the task, the response may be labeled as a plagiarized response and assigned a score of 0. In one example, 1,557 plagiarized responses to independent test questions (questions that elicit spontaneous speech) were collected from the operational TOEFL iBT assessment across multiple years. A number of collected plagiarized responses may be less than 100, between 10 and 200, between 100 and 500, between 500 and 2,000, less than 5,000, or less than 10,000.

During the process of reviewing potentially plagiarized responses, the raters may also collect a data set of external sources that appear to have been used by test takers in their responses. In some cases, the test taker's spoken response may be nearly identical to an identified source; in other cases, several sentences or phrases may be clearly drawn from a particular source, although some modifications may be apparent.

FIG. 1 an example of a transcript 100 of a plagiarized spoken response compared to a source passage. A sample 110 may be a source of plagiarized responses in the data set. Plagiarized response 120 may contain extended sequences of words that directly match idiosyncratic features of this source, such as the phrases "how romantic it can ever be" and "just relax yourself on the beach." In one example, human raters identified 211 different source materials while reviewing the potentially plagiarized responses, and assigned 162 of the passages as sources of the plagiarized responses included in this study. However, all of the 211 identified passages are used as sources in the experiments in order to make the experimental design more similar to an operational setting in which the exact set of source texts that will be represented in a given set of plagiarized responses is not known. A number of passages used as sources may be less than 10, or between 5 and 20, or between 10 and 100, or between 50 and 200, or between 100 and 1,000.

In one example, summary statistics for the 211 source passages was as follows: the average number of words was 97.1 (std. dev.=38.8), the average number of clauses was 10.9 (std. dev.=5.5), and the average number of words per clause was 10.6 (std. dev.=6.2). In addition to the source materials and the plagiarized responses, a set of non-plagiarized control responses may also be obtained in order to conduct classification experiments between plagiarized and non-plagiarized responses. The plagiarized responses may be collected over the course of multiple years. The plagiarized responses may be drawn from many different TOEFL iBT test forms. It may not be practical to obtain control data from all of the test forms represented in the plagiarized set. In one example, the 166 test forms that appeared most frequently in the plagiarized data set were used for the collection of control responses, and 200 test takers were randomly selected from each form, without any overlap with speakers in the plagiarized set. A number of randomly selected test takers may be less than 20, or between 10 and 100, or between 50 and 500, or between 200 and 1,000. The number of test forms used for the collection of control responses may be less than 20, or between 10 and 100, or between 50 and 500, or between 200 and 1,000.

In one example, the two spoken responses from the two questions that elicit spontaneous speech in each test form were collected from each speaker. A number of questions that elicit spontaneous speech in each test form may be one, or two, or between two and five, or between five and ten, or between ten and twenty. A number of spoken responses collected from each speaker may be one, or two, or between two and five, or between five and ten, or between ten and twenty.

In one example, a total of 66,400 spoken responses from 33,200 speakers were obtained as the control set. A number of speakers in a control set may be over 1,000, or between 1,000 and 5,000, or between 5,000 and 10,000, or between 10,000 and 20,000, or between 20,000 and 50,000, or between 50,000 and 100,000. A number of spoken responses in a control set may be over 2,000, or between 2,000 and 5,000, or between 5,000 and 10,000, or between 10,000 and 20,000, or between 20,000 and 50,000, or between 50,000 and 100,000, or between 100,000 and 200,000.

The data available for detecting a plagiarized spoken response may be quite imbalanced. In one example, the size of the control set was almost 43 times of the size of plagiarized set. A ratio of control set size to plagiarized set size may be over 2, or between 2 and 10, or between 10 and 20, or between 20 and 50, or between 50 and 100.

Using content-based features for the task of automatic plagiarized spoken response detection may be effective. Some features may be based on text-to-text similarity. Given a test response, a comparison may be made with each of the reference sources using one or several of the following content similarity metrics: 1) BLEU; 2) Latent Semantic Analysis (LSA); 3) a WordNet similarity metric based on presence in the same synset; 4) a WordNet similarity metric based on the shortest path between two words in the is-a taxonomy; 5) a WordNet similarity metric similar to (4) that also takes into account the maximum depth of the taxonomy in which the words occur; 6) a WordNet similarity metric based on the depth of the Least Common Subsumer of the two words; 7) a Word-Net similarity metric based on Lin's Thesaurus. Other similarity metrics may also be used.

For each of the BLEU- and LSA-based metrics, document-level similarities may be generated by comparing a test response against each of the source materials; then, the maximum similarity may be taken as a single feature to measure the content overlap between the test responses and the source materials. An additional step may be used for the WordNet based metrics to combine the similarity scores for pairs of words into document-level scores: given a test response and a source document, a word in the test response may be first compared with each word in the source, and the maximum similarity value may be obtained for each word in the test response; subsequently, the maximum similarity scores for all the words in the test response may be averaged to generate a feature measuring document-level similarity for the WordNet-based metrics.

Features based on the BLEU metric may be effective in measuring the content appropriateness of spoken responses in the context of English proficiency assessment and in measuring content similarity in the detection of plagiarized spoken responses. Additional features based on the BLEU metric and its variations may also be utilized. The traditional BLEU metric may be combined with the modified n-gram precisions to evaluate a machine-generated translation against multiple reference translations, where n may range from unigram up to 4-gram, or from unigram up to 8-gram, or from unigram up to 12-gram. Given a test response, the standard BLEU score may be calculated for each of the sources and the maximum value may be obtained as one similarity feature.

In one example, 11 different BLEU scores were generated by varying the maximum n-gram order from unigram to 11-gram as features. A number of generated BLEU scores may be between two and five, or between five and ten, or between ten and fifteen. Decreasing the maximum order may increase the classifier's recall by evaluating the overlap of shorter word sequences, such as individual words in the unigram setting. On the other hand, increasing the maximum order may boost the classifier's precision, since it will focus on matches of longer word sequences. In one example, the maximum order of 11 was selected based on the average number of words per clause in source materials, which is near 11. A maximum order may be between two and five, or between five and ten, or between ten and fifteen.

In order to verify the effectiveness of the BLEU features that were extracted by varying the maximum n-gram order, an experiment may be conducted. In one example, 10-fold cross-validation was performed on the whole data set using the decision tree classifier from SKLL. In one example, the 11 BLEU features were extracted based on the output of an automatic speech recognition (ASR) system, and a word error rate was around 28%. A number of extracted BLEU features may be between one and five, or between five and ten, or between ten and fifteen. Precision, recall, and F1-measure on the positive class may be used as the evaluation metrics, where the positive class may be the plagiarized responses.

FIG. 2 is a table illustrating quality of detection of plagiarized spoken response according to one exemplary embodiment. Table 200 shows several BLEU parameters in column 202, and corresponding evaluation metrics precision 222, recall 224, and F1-measure 226. As shown in row 206, compared with the standard BLEU score 204, the recall 224 can be improved from 0.393 to 0.447 by ranging the maximum n-gram order from 1 to 4. As shown in row 208, further extending the maximum order to 11 can boost the precision 222 from 0.429 to 0.438. The combination of 11 BLEU features can improve the F1-score 226 from 0.425 (with the maximum order of 4) to 0.44.

Furthermore, two other types of BLEU-related features may also be extracted. Test takers may construct their plagiarized responses by piecing together content from multiple different source texts. Therefore, all sources may be combined as one reference to be compared with the test response. By ranging the maximum n-gram, 11 features can be generated, hereafter referred to as BLEU AllRef. On the other hand, instead of combining the modified precisions as in the standard BLEU metric, another set of features may be generated by calculating the recalls of matched n-grams (also ranging the maximum order of n-grams from 1 to 11), which can aim to improve the classification recall. This set of features is referred as BLEURV.

Overall, the features can be grouped into three major categories: 1) BLEU-related features, measuring the content similarity by summarizing the n-gram overlap between a test response and the source materials; 2) WordNet-based features, measuring the content similarity by summarizing the word-to-word semantic similarities; and 3) LSA-based features, measuring the content similarity in a latent semantic space. These different types of similarity metrics may be especially appropriate for the task of detecting plagiarized spoken responses based on ASR output, since they do not rely on exact string matches and thus are expected to be robust to modifications between the source text and the plagiarized response. A number of BLEU-related features may be between one and five, between five and ten, between ten and twenty, between twenty and forty, between forty and one hundred. In one example, thirty-three BLEU-related features were used. A number of WordNet based features may be on, or two, or between three and five, or between five and ten, or between ten and twenty. In one example, five WordNet-based features were used. A number of LSA based features may be one, or two, or between three and five, or between five and ten. In one example, one LSA-based feature was used.

The performance of features may depend on the availability of a comprehensive set of source materials. If a test taker uses unseen source materials as the basis for a plagiarized response, the system may fail to detect it. Therefore, additional features may not rely on a comparison with source materials.

The Speaking section of the TOEFL iBT assessment may include both speaking tasks that elicit spontaneous speech and source-based speaking tasks that are assumed to be non-plagiarized. In a given test administration, test takers may be required to respond to all six test questions and plagiarized responses may be more likely to appear in the two speaking tasks that elicit spontaneous speech, since they are not based on specific reading and/or listening passages and thus may elicit a wider range of variation across responses. Since the plagiarized responses may be mostly constructed based on memorized material, they may be delivered in a more fluent and proficient manner compared to the responses that contain fully spontaneous speech. Based on this assumption, additional features may capture the difference between various speaking proficiency features extracted from the plagiarized and spontaneous speech produced by the same test taker; this methodology is specifically designed to detect plagiarized responses to the speaking tasks that elicit spontaneous speech.

These features may be based on an automated spoken English assessment system, SpeechRater$^{SM}$. SpeechRater can automatically predict the holistic speaking proficiency score of a spoken response and generate a set of approximately 100 features to assess different aspects of spontaneous speech. A number of features may be between five and ten, or between ten and fifty, or between fifty and two hundred. In one example, 100 features were used. The automated proficiency scores along with SpeechRater features measuring fluency, pronunciation, prosody, rhythm, vocabulary, and grammar may be used. A number of SpeechRater features may be between five and ten, or between ten and twenty, or between twenty and forty, or between forty and 100. In one example, twenty-nine SpeechRater features were used.

Since most plagiarized responses are expected to occur in the speaking tasks that elicit spontaneous speech, the responses to source-based speaking tasks that are assumed to be non-plagiarized may be based on spontaneous speech. A mismatch between the proficiency scores and the feature values from the responses to speaking tasks that elicit spontaneous speech and the responses to source-based speaking tasks that are assumed to be non-plagiarized from the same speaker can potentially indicate the presence of both prepared speech and spontaneous speech, and, therefore, the presence of plagiarized spoken responses.

A number of features can be extracted according to each of the proficiency scores and SpeechRater features, given a response to speaking tasks that elicit spontaneous speech from a test taker, along with the other responses to speaking tasks that elicit spontaneous speech and responses to source-based speaking tasks that are assumed to be non-plagiarized from the same test taker. A number of responses to speaking tasks that elicit spontaneous speech may be one, or two, or between three and five, or between five and ten. In one example, two responses to speaking tasks that elicit spontaneous speech were used. A number of responses to source-based speaking tasks that are assumed to be non-plagiarized may be one, or two, or between three and five, or between five and ten. In one example, four responses to source-based speaking tasks that are assumed to be non-plagiarized were used.

The difference of score/feature values between responses to speaking tasks that elicit spontaneous speech may be calculated as a feature, which may be used to deal with the case in which only one response to speaking task that elicits spontaneous speech is plagiarized and the other response contains spontaneous speech. Basic descriptive statistics, including mean, median, min, and max, may be obtained across the responses to source-based speaking tasks that are assumed to be non-plagiarized. The differences between the score/feature value of the response to speaking tasks that elicit spontaneous speech and these four basic statistics (mean, median, min, and max) may be extracted as additional features. Another feature may also be extracted by standardizing the score/feature value of the response to speaking tasks that elicit spontaneous speech with the mean and standard deviation from the responses to source-based speaking tasks that are assumed to be non-plagiarized. A set of features may be extracted, referred as SRater. A number of features in SRater may be between ten and fifty, or between fifty and one hundred, or between one hundred and five hundred. In one example, 180 features were extracted to be included in SRater.

Spoken responses may be transcribed into text so that they can be compared with the source materials to measure the text-to-text similarity. However, due to the large amount of spoken responses, it may be not practical to manually transcribe all of them; therefore, the automatic speech recognition engine from SpeechRater may be employed. Both the training and evaluation sets used to develop the speech recognizer may consist of similar spoken responses drawn from the same assessment and may not overlap with the data sets included in this study. In one example, the word error rate on a held-out evaluation set was around 28%. In one example, due to the failure of the ASR system on several spoken responses, a total of 1,528 plagiarized and 65,840 control responses were included in the experiments. A number of plagiarized responses may be between 100 and 1,000, or between 1,000 and 5,000, or between 5,000 and 20,000. A number of control responses may be between 1,000 and 10,000, or between 10,000 and 100,000, or between 100,000 and 500,000.

In one example, the data was imbalanced with only 2.3% of the responses being authentic plagiarized ones. Therefore, in one example, 10-fold cross validation was performed for all experiments instead of partitioning the data into training and testing sets. A fraction of responses being authentic plagiarized responses maybe between 0.1% and 1%, or between 1% and 5%, or between 5% and 50%.

SKLL is a python tool that makes it simpler to run common Scikit-Learn experiments with pre-generated features. It includes various classification methods, such as decision tree, random forest, and AdaBoost. In one example, with a variety of features from 4 different categories, AdaBoost using a decision tree as the weak classifier achieved the overall best performance. Therefore, the AdaBoost method may be used to build classification models, and the F1-measure on the positive class may be used as the objective function for model training.

FIG. 3 is a table illustrating quality of detection of plagiarized spoken response according to an exemplary embodiment. As shown in table 300, each feature set in column 302 may be used to build classification models, and the results may be evaluated using the precision 322, recall 324, and F1-measure 326 of the positive class. All of the BLEU-related features 304, 306, and 308 result in relatively high performance. In particular, the recall-based BLEURV features 306 achieve the best F1-measure across the different feature sets (0.592), and its recall is higher than the precision-based BLEU features 304 (0.477 vs. 0.461). Compared to the content similarity features, the SRater features 314 achieved a lower F1-measure (0.238). Any two of the three sets of BLEU-related features, or all three of them, may be combined. The classification results show that the combination of all three feature sets, i.e., BLEU, BLEURV, and BLEUAffRef, can lead to the best performance, with an F1-measure of 0.682, which outperforms each individual feature set. Therefore, all of the BLEU-related features may be used in a single feature set, henceforth named as BLEU All.

FIG. 4 is a table illustrating quality of detection of plagiarized spoken response according to another exemplary embodiment. A sequence of additive experiments (shown in column 402) may be conducted by adding only one type of feature into the classification models at a time. The four feature sets may be added in the following order, based on their classification performance described above: BLEU All (404), WordNet (406), LSA (408), SRater (410). As shown in table 400, by combining all the proposed features in the classification models, the best results in this example can be achieved with a precision (422) of 0.821, a recall (424) of 0.62, and an F1-measure (426) of 0.706. The highest precision in this example can be obtained when only using the BLEU All features (404), and it decreases slightly from 0.829 to around 0.82 by adding the other three type of features. However, by adding them, the recall 424 in this example can be increased from 0.581 to 0.62. In particular, the SRater feature set in this example improves the recall of the classification model from 0.603 to 0.62, even though this feature set by itself in this example can only obtain a recall of 0.164, as shown in FIG. 3. In one example, the best performing classifier identified 1,157 samples as plagiarized from the total of 67,369 responses in the 10-fold cross validation procedure.

An automatic system described herein can be applied in a large-scale assessment of English speaking proficiency. In order to be able to extrapolate about how the system would perform in an actual scenario with a small number of plagiarized responses hidden among a huge number of spontaneous responses, the performance of the system on data sets with different distributions of positive and negative samples may be examined. Under this approach, all of the plagiarized responses may be included but the control responses may be randomly re-sampled to control the ratio between plagiarized and control responses. In one example, the overall ratio between plagiarized and control responses in the data set was around 1:43. Control responses may be randomly sampled to obtain several data sets with different distributions. In one example, the ratios were 1:1, 1:5, 1:10, and 1:20. For each ratio, 100 iterations were run in this example. Ratios may be between 1:1 and 1:2, or between 1:2 and 1:5, or between 1:5 and 1:10, or between 1:10 and 1:20, or between 1:20 and 1:50, or between 1:50 and 1:100. A number of iterations for each ratio may be between 5 and 10, or between 10 and 50, or between 50 and 200.

FIG. 5 is a table illustrating quality of detection of plagiarized spoken response according to another exemplary embodiment. The averages of the evaluation metrics (precision 522, recall 524, and F1 measure 526) are reported in table 500. Table rows correspond to ratios between plagiarized and control responses of 1:1 (504), 1:5 (506), 1:10 (508), 1:20 (510), and 1:43 (512). When the same amount of plagiarized and control responses are present in the experiments, the detection system can achieve an F1-measure of 0.931. However, when this ratio is increased from 1:1 to 1:43, recall dramatically drops 32%, from 0.912 to 0.62, and precision decreases by 14%, from 0.951 to 0.821. Therefore, improving the recall either by developing new features or by tuning the classification models may make the system most effective in a practical application for a large-scale assessment.

A system which can benefit an assessment of English speaking proficiency by automatically detecting potentially plagiarized spoken responses may include features based on automatic plagiarism detection methods commonly used on written texts, in which the content similarity between a test response and a set of source materials collected from human raters are measured. In addition, features which do not rely on the human effort involved in source material collection can be applied to unseen test questions. Such features may be able to capture the difference in speech patterns between plagiarized responses and spontaneous responses from the same speaker in a test. Classification models may be evaluated on a large data set collected from an operational test. In one example, experimental results demonstrated that the automatic detection system can achieve an F1-measure of 70.6% when the ratio between plagiarized and control responses is around 1:43.

The task of applying an automatic system in a large-scale operational assessment may be quite challenging, since typically only a small number of plagiarized responses are buried among a large amount of non-plagiarized responses to a wide range of different test questions. Deep learning techniques that have recently shown their effectiveness in the fields of both speech processing and natural language understanding may be used to enhance SpeechRater performance. This may improve the ASR output and generate more robust SpeechRater features as well as improve the metrics used to measure the content similarity between test responses and source materials. Further analysis may be conducted to determine the extent of differences between plagiarized and spontaneous responses produced by the same test taker, and additional features may be added based on the finding. A method may automatically detect the source materials from a large amount of test responses.

FIG. 6 is a diagram illustrating an exemplary method 600 of detection of plagiarized spoken response. In step 610, a first spoken response is digitally recording, the first spoken response being a response to a speaking task that elicits spontaneous speech. In step 620, a first set of speaking proficiency features of the first spoken response is calculated. In step 630, a second spoken response is digitally recorded, the second spoken response being a response to a source-based speaking task that is assumed to be non-plagiarized. In step 640, a second set of speaking proficiency features of the second spoken response is calculated. In step 650, the first set of speaking proficiency features and the second set of speaking proficiency features are compared. In step 660, the first spoken response is classified as plagiarized or non-plagiarized based on the comparison of the first and the second set of speaking proficiency features.

Figure 7A:
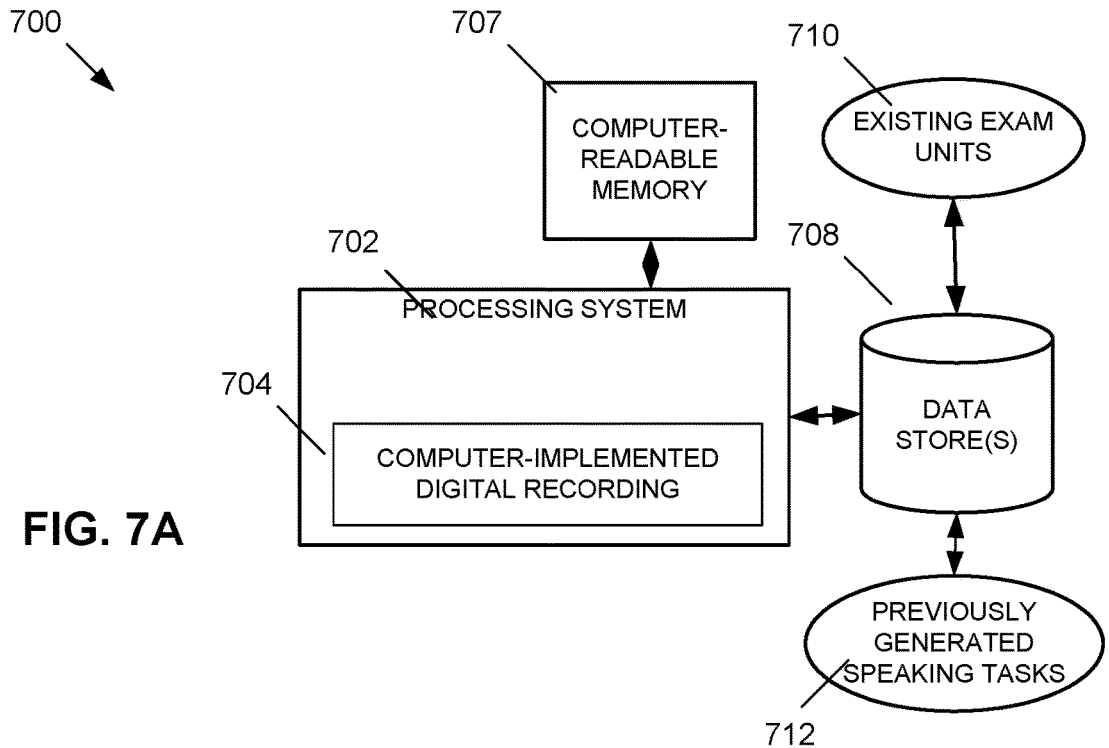
FIGS. 7A, 7B, and 7C depict example systems for implementing the approaches described herein for automatic detection of plagiarized spoken response.
Figure 7B:
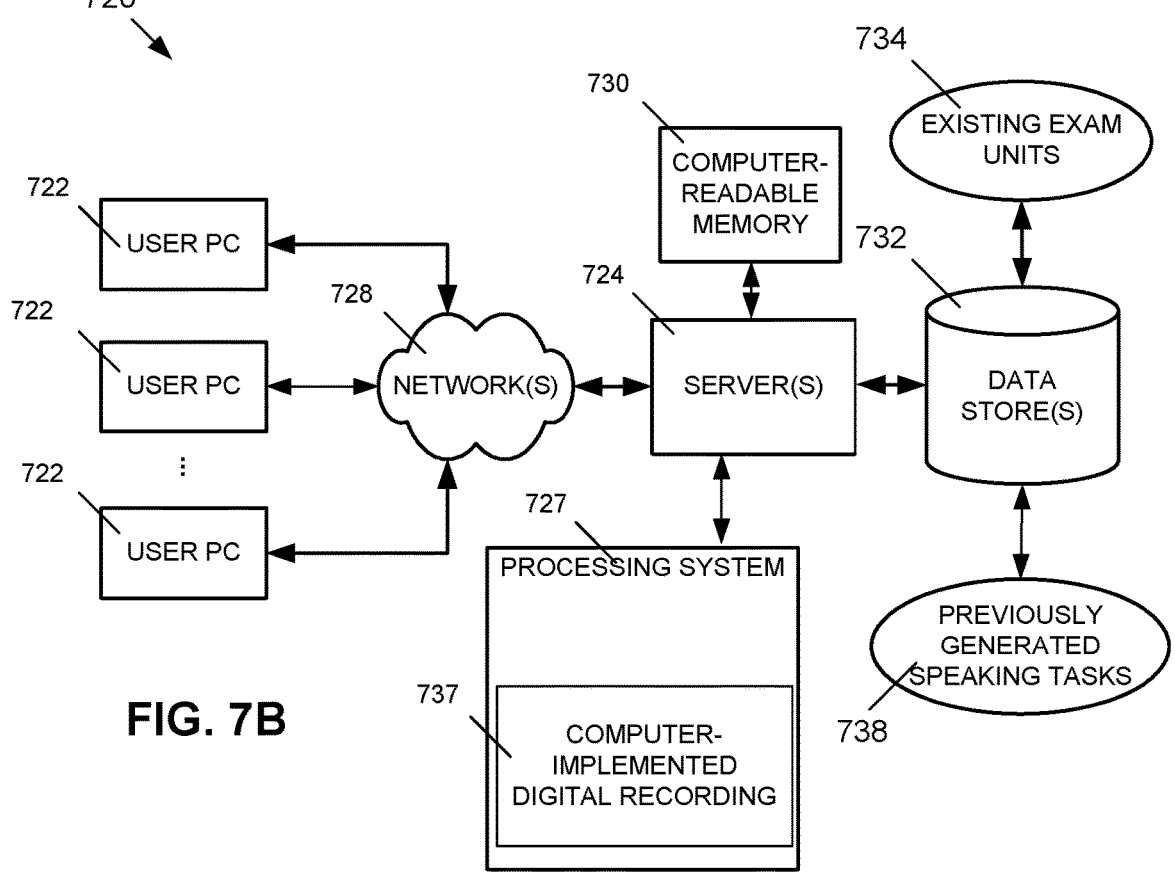
Figure 7C:
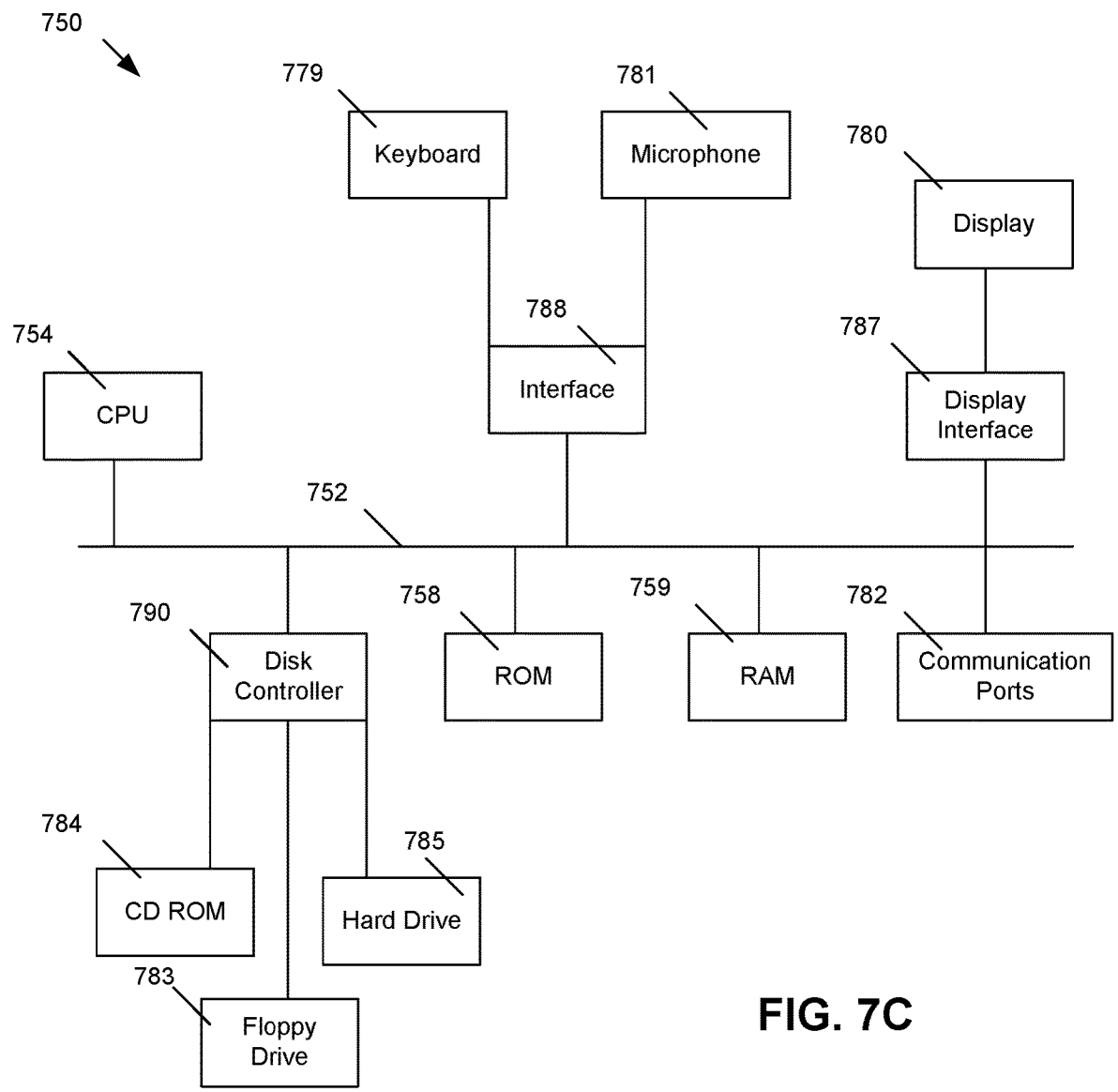

FIGS. 7A, 7B, and 7C depict example systems for implementing the approaches described herein for automatic detection of plagiarized spoken response.

FIGS. 7A, 7B, and 7C depict example systems for implementing the approaches described herein for automatically generating texts appropriate for a reading level of an individual. For example, FIG. 7A depicts an exemplary system 700 that includes a standalone computer architecture where a processing system 702 (e.g., one or more computer processors located in a given computer or in multiple computers that may be separate and distinct from one another) includes a computer-implemented digital recording 704 being executed on the processing system 702. The processing system 702 has access to a computer-readable memory 707 in addition to one or more data stores 708. The one or more data stores 708 may include existing exam units 710 as well as previously generated speaking tasks 712. The processing system 702 may be a distributed parallel computing environment, which may be used to handle very large-scale data sets.

FIG. 7B depicts a system 720 that includes a client-server architecture. One or more user PCs 722 access one or more servers 724 running an appropriate-level digital recording 737 on a processing system 727 via one or more networks 728. The one or more servers 724 may access a computer-readable memory 730 as well as one or more data stores 732. The one or more data stores 732 may include existing exam units 734 as well as previously generated speaking tasks 738.

FIG. 7C shows a block diagram of exemplary hardware for a standalone computer architecture 750, such as the architecture depicted in FIG. 7A that may be used to include and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 758 and random access memory (RAM) 759, may be in communication with the processing system 754 and may include one or more programming instructions for performing the method of automatically generating texts appropriate for a reading level of an individual. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 707, 730, 758, 759 or data stores 708, 732, 783, 784, 788 may include one or more data structures for storing and associating various data used in the example systems for automatically generating texts appropriate for a reading level of an individual. For example, a data structure stored in any of the aforementioned locations may be used to store data from XML files, initial parameters, and/or data for other variables described herein. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A processor implemented method for a detection of a plagiarized spoken response, the method comprising:
digitally recording a first spoken response using a microphone, the first spoken response being a response of a user to a speaking task that elicits spontaneous speech;
calculating a first set of speaking proficiency features of the first spoken response;
digitally recording a second spoken response using the microphone, the second spoken response being a response of the user to a source-based speaking task;
calculating a second set of speaking proficiency features of the second spoken response;
performing a comparison between the first and the second spoken responses of the same user in response to different speaking tasks by comparing the first set of speaking proficiency features and the second set of speaking proficiency features; and classifying the first spoken response as plagiarized or non-plagiarized by an F1-measure based on the comparing the first and the second set of speaking proficiency features, wherein the F1-measure of classifying the first spoken response as plagiarized or non-plagiarized decreases when a ratio of plagiarized first spoken responses to non-plagiarized first spoken responses increases.

2. The method of claim 1, wherein the speaking task that elicits spontaneous speech comprises providing an extended response containing spontaneous speech.

3. The method of claim 1, wherein the source-based speaking task comprises constructing a response based on summarizing or synthesizing a material provided in a reading passage or in a listening passage.

4. The method of claim 1, wherein the first set of speaking proficiency features comprises features measuring, for the first spoken response, at least one of the following: rhythm and grammar.

5. The method of claim 1, wherein the second set of speaking proficiency features comprises features measuring, for the second spoken response, at least one of the following: rhythm and grammar.

6. The method of claim 1, wherein the comparing comprises conducting a statistical analysis of the first set of speaking proficiency features and the second set of speaking proficiency features.

7. The method of claim 1, further comprising, prior to the classifying, evaluating of a content similarity between the first spoken response and a source passage.

8. The method of claim 7, wherein the classifying is based on both the comparing the first and the second sets of speaking proficiency features and the evaluating of the content similarity.

9. The method of claim 1, further comprising:
calculating a first holistic speaking proficiency score for the first spoken response;
calculating a second holistic speaking proficiency score for the second spoken response; and
wherein the classifying the first spoken response as plagiarized or non-plagiarized is based, at least in part, on a comparison of the first and second holistic speaking proficiency scores.

10. The method of claim 1, wherein the first and second spoken responses are obtained during a standardized assessment of non-native spoken English.

11. The method of claim 1,
wherein the F1-measure of classifying the first spoken response as plagiarized is over 0.9 when a ratio of plagiarized first spoken responses to non-plagiarized first spoken responses is 1:1, and
wherein the F1-measure of classifying the first spoken response as plagiarized is over 0.8 when the ratio of plagiarized first spoken responses to non-plagiarized first spoken responses is 1:43.

12. A system for detection of a plagiarized spoken response, comprising:
one or more data processors; and
a non-transitory computer-readable medium encoded with instructions for commanding the one or more data processors to execute steps of a process that include:
digitally recording a first spoken response using a microphone, the first spoken response being a response of a user to a speaking task that elicits spontaneous speech;

calculating a first set of speaking proficiency features of the first spoken response;
digitally recording a second spoken response using the microphone, the second spoken response being a response of the user to a source-based speaking task;
calculating a second set of speaking proficiency features of the second spoken response;
performing a comparison between the first and the second spoken responses of the same user in response to different speaking tasks by comparing the first set of speaking proficiency features and the second set of speaking proficiency features; and
classifying the first spoken response as plagiarized or non-plagiarized by an F1-measure based on the comparing the first and the second set of speaking proficiency features, wherein the F1-measure of classifying the first spoken response as plagiarized or non-plagiarized decreases when a ratio of plagiarized first spoken responses to non-plagiarized first spoken responses increases.

13. The system of claim 12, wherein the speaking task that elicits spontaneous speech comprises providing an extended response containing the spontaneous speech and the source-based speaking task comprises constructing a response based on summarizing or synthesizing a material provided in a reading passage or in a listening passage.

14. The system of claim 12, wherein the first and the second sets of speaking proficiency features comprises features measuring, for the first spoken response, at least one of the following: fluency, pronunciation, prosody, rhythm, vocabulary, and grammar.

15. The system of claim 12, further comprising, prior to the classifying, evaluating a content similarity between the first spoken response and a source passage and wherein the classifying is based on both the comparing the first and the second sets of speaking proficiency features and an evaluation of the content similarity.

16. The system of claim 12, further comprising:
calculating a first holistic speaking proficiency score for the first spoken response;
calculating a second holistic speaking proficiency score for the second spoken response; and
wherein the classifying the first spoken response as plagiarized or non-plagiarized is based, at least in part, on a comparison of the first and second holistic speaking proficiency scores.

17. The system of claim 12, wherein the first and second spoken responses are obtained during a standardized assessment of non-native spoken English.

18. A non-transitory computer-readable storage medium for detection of a plagiarized spoken response, the computer-readable storage medium comprising computer executable instructions which, when executed, cause a processing system to execute steps comprising:
digitally recording a first spoken response using a microphone, the first spoken response being a response of a user to a speaking task that elicits spontaneous speech;
calculating a first set of speaking proficiency features of the first spoken response, wherein the first set of speaking proficiency features comprises BLEU, BLEURV, and BLEUAffRef feature sets;
digitally recording a second spoken response using the microphone, the second spoken response being a response of the user to a source-based speaking task;
calculating a second set of speaking proficiency features of the second spoken response;

performing a comparison between the first and the second spoken responses of the same user in response to different speaking tasks by comparing the first set of speaking proficiency features and the second set of speaking proficiency features; and classifying the first spoken response as plagiarized or non-plagiarized by an F1-measure based on the comparing the first and the second set of speaking proficiency features, wherein the F1-measure of classifying the first spoken response as plagiarized or non-plagiarized decreases when a ratio of plagiarized first spoken responses to non-plagiarized first spoken responses increases.

19. The non-transitory computer-readable storage medium of claim 18, wherein the speaking task that elicits spontaneous speech comprises providing an extended response containing the spontaneous speech and the source-based speaking task comprises constructing a response based on summarizing or synthesizing a material provided in a reading passage or in a listening passage.

20. The non-transitory computer-readable storage medium of claim 18, wherein the comparing comprises conducting a statistical analysis of the first set of speaking proficiency features and the second set of speaking proficiency features.

21. The non-transitory computer-readable storage medium of claim 18, further comprising, prior to the classifying, evaluating a content similarity between the first spoken response and a source passage and wherein the classifying is based on both the comparing the first and the second sets of speaking proficiency features and an evaluation of the content similarity.

\* \* \* \* \*